United States Patent Office 3,021,156
Patented Feb. 13, 1962

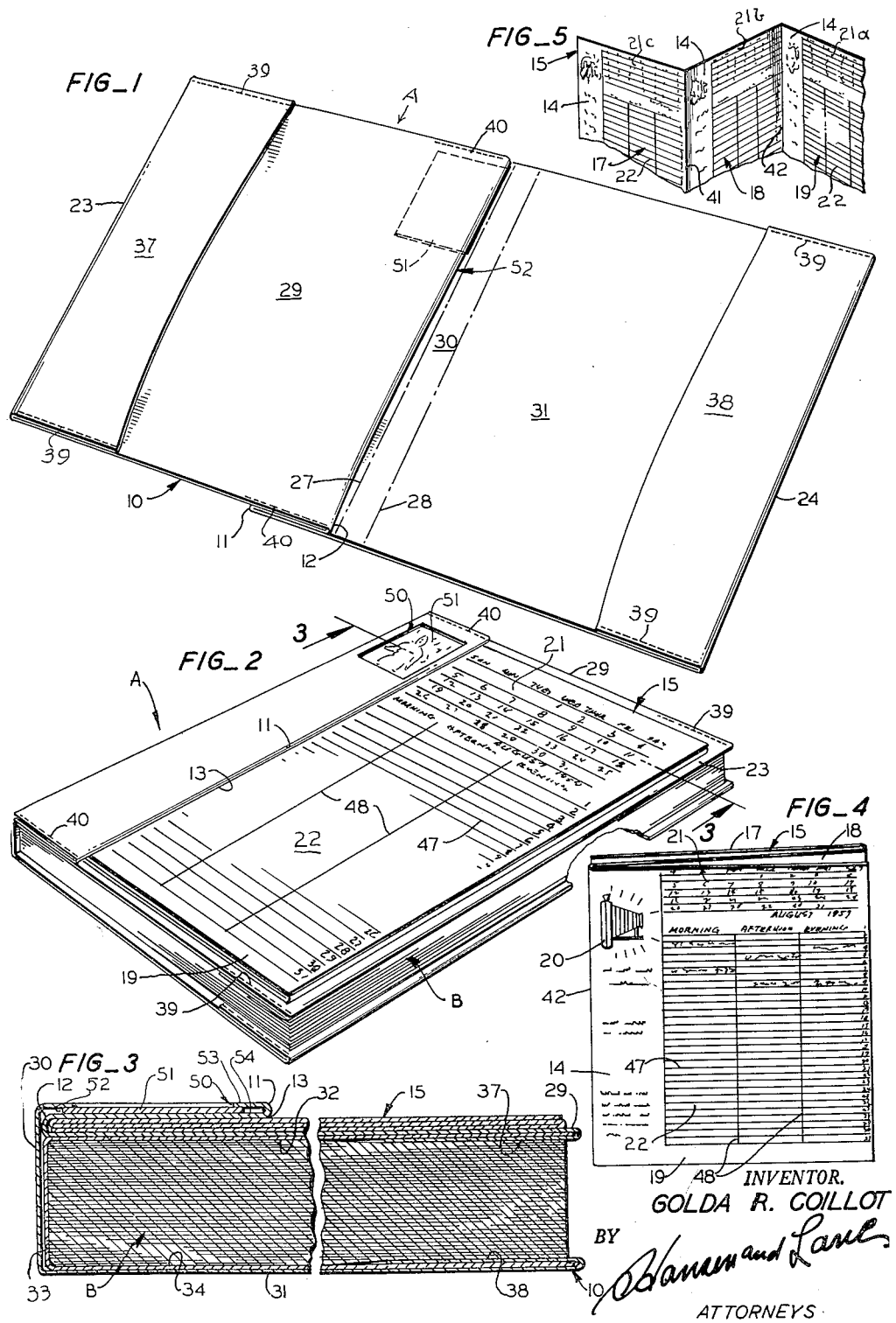

3,021,156
COMBINED BOOK PROTECTOR AND MEMO-CALENDAR WITH CONCEALED ADVERTISEMENT
Golda R. Coillot, San Jose, Calif.
(609 Grand Fir, Apt. 14, Sunnyvale, Calif.)
Filed Nov. 20, 1959, Ser. No. 854,455
4 Claims. (Cl. 281—17)

The present invention relates to a combined book protector and advertising memo calendar.

Great quantities of advertising specialties are distributed gratis each year by firms and individuals attempting to sell their products to prospective customers. Sometimes these advertising specialties are quite expensive, but since they usually display the donor's advertisement on their face, they frequently are not used by their recipients customers', since most people do not care to display advertisements for others, particularly in their homes or on their office desks where such items would be in full view.

Most people of any financial responsibility whatever in the United States have a telephone, and numerous advertising specialties pertaining to telephones have been developed. Included among these specialties are telephone book protectors and memopads. However, like other advertising specialties mentioned previously herein, such prior specialty items frequently have not been used by their recipients due to the fact that the donor's advertisement was visible thereon when such item was in use.

The present invention contemplates the provision of a combined book protector and replaceable calendar memorandum. Each replacement calendar memorandum carries a plurality of advertising messages to the recipient, but no portion of such advertisement is visible to others in the ordinary use of either the book covered by such protector, or the calendar memorandum.

The invention also provides an improved, book protector and calendar memorandum folder wherein a marginal portion of each of a plurality of pages of the folder has an advertising message displayed in a marginal portion thereof, which marginal portion is adapted to be inserted into, and thus wholly concealed within, a pocket formed by a double fold in a portion of the protector overlying the front cover of a book upon which the protector is applied.

A further object of the invention is to provide a book protector having a pocket formed along one marginal portion thereof, and an insert, such as a folding calendar memorandum comprising a plurality of foldable page portions, each of said page portions having calendar and memorandum indicia printed thereon, each page portion having also a marginal area with an advertising message printed thereon, said marginal areas being adapted to be inserted into, and thus concealed within, the pocket in the book protector.

A further object of the invention is to provide an improved combination book protector and advertising memorandum insert having a framed opening therein to receive a picture.

Another object of the invention is to provide an improved combination book protector and advertising calendar memorandum.

These, and other objects and advantages of the invention, will be apparent from the following description and the accompanying drawings, wherein:

FIG. 1 is a perspective view of the inner side of a book protector made in accordance with the invention as it appears in fully outspread position, and before being applied to a book.

FIG. 2 is a perspective view of the protector shown in FIG. 1 as it appears when applied to a book, such as, for example, a telephone book, and with an advertising calendar memorandum inserted in the pocket of the protector.

FIG. 3 is an enlarged, sectional view taken along line 3—3 of FIG. 2, intermediate portions being broken away.

FIG. 4 is a front elevational view in reduced scale of the advertising, calendar insert in the form of a three page folder as it appears separately from the book protector.

FIG. 5 is a fragmentary, perspective view in further reduced scale of the upper portion of the advertising, calendar insert of FIG. 4 as it appears in partially opened out condition, and showing each of the page folds thereof.

Briefly, the invention comprises a combined book protector and advertising, calendar insert A, which, for the purposes of the present description, will be considered as adapted to be applied to a telephone book B of a type well known within the United States. A book protector 10, comprising one of the two principal elements of the present combination, has two reverse fold lines 11 and 12 formed therein. The portions of book protector material between these fold lines is folded down to closely overlie the front cover protecting portion of the protector 10 to thereby provide a pocket 13 for receiving therein a calendar and advertising insert 15.

Each of three page folds 17, 18 and 19 of the insert 15 has the marginal portion 14 thereof on the side toward the pocket 13 imprinted with an advertising message 20 (FIGS. 4 and 5) which is directed solely to the recipient or owner of the device A. When the insert 15 is folded to display a current month's calendar 21 imprinted thereon, and is inserted in the pocket 13 as shown in FIG. 2 to the full depth of the pocket, the marginal portion 14, with its advertising matter thereon, is completely concealed within the pocket, and only the current month's calendar 21 and, if desired, a memorandum area 22 remain visible.

Referring to the drawings in greater detail, the book protector 10 may be of any suitable material, such as, for example, leather, tough paper, cardboard, plastic-coated or all plastic sheet material. The cover material itself is not a feature of the invention, and many suitable materials at various prices are available.

The book protector 10 is made from a rectangular blank of the desired material. Although not illustrated before folding, the shape of such blank will be obvious from FIG. 1, since such blank is similar to FIG. 1 before making end folds 23 and 24, and the pocket forming double folds 11 and 12 therein. Two creases 27 and 28 also are scored in the protector 10 to divide the latter into a front cover portion 29, a back portion 30 and a rear cover portion 31, to overlie, respectively, the front cover 32, the back 33 and the rear cover 34 of the book B.

End portions 37 and 38 of the protector 10 are reversely folded inwardly over their respective cover portions 29 and 31, and are suitably secured thereto along their upper and lower edges as by stitching 39 to form pockets to receive therein the front and rear covers 32 and 34, respectively (FIG. 3), of a book B to which the protector is adapted to be applied.

The upper and lower edges of the pocket 13 formed by the double reverse folds 11 and 12 are secured, as by stitching 40, to retain the parts against unfolding.

The illustrated insert 15 is in the form of a folder divided into the three page portions 17, 18 and 19 (FIGS. 4 and 5) by two lines of fold 41 and 42. Said page portions are all of the same size, and when folded as shown in FIGS. 2 and 4, the insert 15 is sufficiently smaller than the front cover portion 29 of the protector 10, that the insert may be easily inserted into the pocket 13 to the full depth thereof, and when so inserted does not project marginally beyond the folded outer edge 23 (FIG. 2) of the front cover portion 29.

Each insert folder 15 is designed to cover a period of three calendar months. Each of the page portions 17, 18 and 19 of the folder 15 has an advertising message printed along the left hand marginal portion 14 thereof which is adapted to be concealed within the pocket 13 when the insert 15 is fully inserted therein as shown in FIG. 2. Calendars 21a, 21b and 21c, one for each of the three successive months for which the folder is to endure, are printed on the exposed portions of the successive pages 17, 18 and 19, respectively, and memo lines 47, numbered successively for the days of the month of the calendar 21 thereon, may also be imprinted on the exposed portion of each page of the insert, as shown in FIG. 4. Appropriate column lines 48 also may be provided to divide the memo area 22 into suitable columns, which may be appropriately headed, as for example "Mornings," "Afternoons" and "Evenings."

Just prior to the termination of each period for which the insert 15 is provided, a new insert is either sent to each recorded recipient of a protector 10, or may be had by asking for such new insert at the place of business of the sender. A list of such recipients is retained by the sender when the original book protectors and the first inserts 15 therefor are distributed. At the beginning of each month, the owner of a protector 10 will withdraw the insert 15 from its pocket 13, will re-fold it to expose the page portion thereof for the succeeding month, and will then re-insert it in the pocket. During this time, while the folder is withdrawn, the person performing the operation will be exposed to the advertising message printed on the marginal portion of each sheet. Furthermore, when he receives his new folder for each succeeding period, he will be exposed to a new succession of advertising messaegs, and will, in most instances, experience a renewed feeling of gratitude for receiving the gift. All of this is most effective from the advertising donor's viewpoint.

As an additional feature, an opening 50 may be cut in the protector 10 in the outer fold of the pocket 13 so as to be exposed when a book B upon which the protector 10 is mounted is closed as in FIG. 2. A photographic print 51 may then be inserted into the space 52 (FIGS. 1 and 2) between the two thicknesses 53 and 54 (FIG. 3) of the outer wall of the pocket 13 when the cover portion 29 of the protector 10 is swung outwardly as shown in FIG. 1, and before the front book cover 32 is inserted in the protector.

The invention provides a simple and most effective advertising speciality, and one which is apt to have a very strong selling influence on the recipient. Furthermore, it is a device which is very apt to be used by its recipient, since no advertising message is in view once the marginal portion 14 of the insert 15 is inserted in the pocket 10 ready for use.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

1. A combined book protector and advertising calendar comprising a sheet of protective material having contiguous portions thereof adapted to enclose, respectively, the front cover, back binding, and rear cover of a book of known size, a portion at the outer end of each cover-enclosing portion of the protector material for attaching the protector to the covers of a book to which it is applied, a pair of reverse folds formed in parallel, spaced apart relation in the front cover enclosing portion of the protector material, one of said reverse folds being spaced outwardly from, and the other being adjacent the back binding enclosing portion of said material, the portion of the protector material between said reverse folds being folded down to closely overlie the front cover enclosing portion of said material, means securing the upper and lower edges of said overlying material to the front cover enclosing portion of said material to thereby form a pocket between the overlying material and the front cover portion upon which it is superposed, said pocket facing toward the free end of the front cover enclosing portion of said material, and being of a width substantially less than that of said front cover enclosing portion, an insert of sheet material of a height less than the length of such pocket, so as to be insertable therein to the full depth of the pocket and of a width corresponding substantially to that of the front cover protecting portion so as to project a substantial distance laterally beyond said pocket when inserted therein, the portion of the insert adapted to be inserted in said pocket having an advertising message thereon which advertising message is fully concealed by the pocket when the insert is inserted therein to the full depth of the pocket, and the projecting portion of the insert having non-advertising dated material thereon, which non-advertising material is fully exposed beyond the pocket when the insert is so inserted.

2. An arrangement according to claim 1 wherein the insert comprises a plurality of contiguous page portions of a single sheet of material, fold lines separating adjacent page portions thereof, each page portion thereof being of a size slightly smaller than the front cover portion of the protector with which the insert is to be used, and each page portion having the portion thereof adapted to be inserted in the protector pocket imprinted with an advertising message, and having the portion thereof adapted to project from the pocket imprinted with a calendar for one month, the calendars on successive page portions being for successive months.

3. A combined book protector and advertising calendar comprising a sheet of protective material having contiguous portions thereof adapted to enclose, respectively, the front cover, back binding, and rear cover of a book of known size, means on the outer end of each cover enclosing portion of the protector material for attaching the protector to the covers of a book to which it is applied, a pair of reverse folds formed in the front cover enclosing portion of the protector material adjacent the back binding enclosing portion thereof, the protector material between said pair of reverse folds being folded down to closely overlie the front cover enclosing portion of the protector material, the outer layer of said folded portion having an opening therein to expose and frame a picture inserted between the layers thereof, means securing the upper and lower edges of said folded, superposed portion to the front cover enclosing portion of the protector material to thereby form a pocket facing outwardly toward the free end of the front cover enclosing portion of said protector material, the inner edge of said folded portion being open to receive a picture inserted from the interior of the protector between the layers thereof for exposure of the picture in the opening in the outer layer of said folded portion, an insert of sheet material adapted to be inserted into such pocket and of a size to project laterally therefrom, the portion of the insert adapted to be inserted in said pocket having an advertising message imprinted thereon, and the projecting portion of the insert having a calendar imprinted thereon.

4. A combined book protector and advertising calendar comprising a sheet of protective material having contiguous portions thereof adapted to enclose, respectively, the front cover, back binding, and rear cover of a book of known size, a portion at the outer end of each cover-enclosing portion of the protector material for attaching the protector to the covers of a book to which it is applied, a pair of reverse folds formed in parallel, spaced apart relation in the front cover enclosing portion of the protector material, one of said reverse folds being spaced outwardly from, and the other being adjacent an edge of the front cover enclosing portion of said material, the portion of the protector material between said reverse folds being folded down to closely overlie the front cover enclosing portion of said material, means securing the upper and lower edges of said overlying material to the front cover enclosing portion of said material to thereby form a pocket between the overlying material and the front cover portion upon which it is superposed, said pocket facing toward the portion of the front cover enclosing portion of said material beyond such pocket, and being of a width substantially less than that of said front cover enclosing portion, an insert of sheet material of a size to be insertable in the pocket to the full depth of the latter, and of a width to project a substantial distance laterally beyond said pocket when inserted fully therein, the portion of the insert adapted to be inserted in said pocket having an advertising message thereon which advertising message is fully concealed by the pocket when the insert is inserted therein to the full depth of the pocket, and the projecting portion of the insert having non-advertising dated material thereon, which non-advertising material is fully exposed beyond the pocket when the insert is so inserted.

References Cited in the file of this patent

UNITED STATES PATENTS

| | | |
|---|---|---|
| 398,875 | Benson | Mar. 5, 1889 |
| 848,714 | Wise | Apr. 2, 1907 |
| 1,696,629 | Fenno | Dec. 25, 1928 |